Patented Nov. 23, 1948

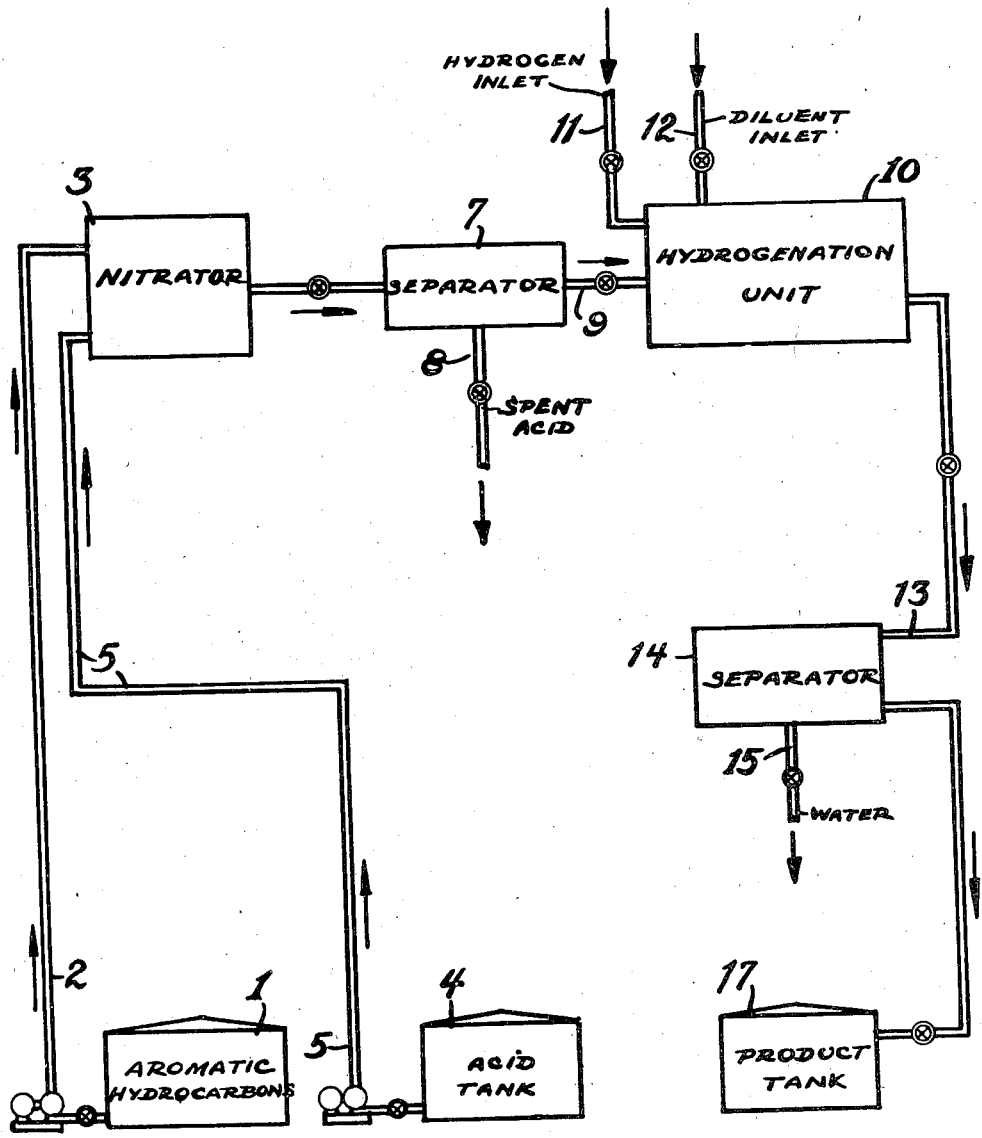

2,454,468

UNITED STATES PATENT OFFICE 2,454,468

METHOD FOR PREPARING AROMATIC NITRO COMPOUNDS AND AMINES

Edward H. McArdle, Linden, N. J., assignor to Standard Oil Development Company, a corporation of Delaware Application August 18, 1943, Serial No. 499,067

6 Claims. (Cl. 260—580)

This invention relates to the preparation of aromatic amines, and more particularly, it relates to a method for preparing amines by nitrating aromatic hydrocarbons and reducing the nitro compounds formed.

It has been known for a long time that certain amines, particularly aromatic amines, such as xylidene, are very valuable blending agents for aviation gasolines. These compounds have the property of improving the performance of aviation fuel, particularly under rich mixture conditions, during the period when the airplane is taking off from the ground or is suddenly accelerating in flight.

According to the present invention, such aromatic amines are prepared by nitrating aromatic hydrocarbons under controlled conditions to produce the mono-nitro derivative and then reducing the mono-nitro derivative under specially controlled conditions to produce the corresponding amine.

In general, the nitro group ($NO_2$) is introduced into the aromatic nucleus by the direct action of nitric acid. This action, which is characteristic of aromatic compounds, may be represented by the equation:

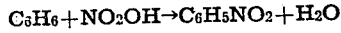

By the further action of nitric acid, additional nitro groups may be introduced into the nucleus according to the equation:

The formation of the nitro compound takes place with greater or less ease, depending on the nature of the substance to be nitrated. In cases where the compound is very easily nitrated, the action of nitric acid diluted with water is sufficient to bring about the formation of the nitro derivative, but in other cases the presence of sulfuric acid is necessary before nitration can be effected. This is generally true with benzene and its alkyl substitution products.

In the usual commercial process for the nitration of aromatic hydrocarbons, such as benzene or toluene, with mixtures of nitric and sulfuric acids, conditions are controlled so that first the mono-nitro compound is formed which is then separated from unreacted hydrocarbons and then further reacted with more concentrated nitric and sulfuric acid to produce poly-nitro compounds. In order to produce predominant amounts of the mono-nitro derivative, the reaction is carried out in the first stage under carefully controlled conditions of temperature and acid concentration. For example, mono-nitro toluene is prepared in large quantities commercially by reacting approximately 300 parts by weight of mixed sulfuric and nitric acid (1 part of 75% nitric acid, Sp. G. 1.43, and 1½ parts by weight of 96% sulfuric acid, Sp. G. 1.84) with 100 parts by weight of toluene at 55° C.

In order to introduce additional nitro groups into the mono-nitro derivative in any great quantities, much larger quantities of sulfuric acid and fuming nitric acid are required. Nevertheless, up to 10% of poly-nitro compounds are formed during the first stage under conditions found to be most suitable for the preparation of the mono-nitro compounds.

When the mono-nitro compound is the desired final product, the presence of these small amounts of poly-nitro compounds is undesirable. These poly-nitro compounds decompose more or less explosively at not too elevated temperatures making it difficult to purify the mono-nitro compound by distillation. Furthermore, if it is desired to further react the mono-nitro compound as, for example, if it is desired to produce the corresponding amine by reduction of the nitro group, temperatures may easily be encountered during the reduction at which the poly-nitro compounds decompose. This decomposition may well be hazardous as these compounds are known to decompose violently, the decomposition at times reaching explosive violence. It is therefore desirable to carry out the formation of the mono-nitro compound under such conditions that very little, if any, of the poly-nitro compounds are formed. It is also desirable that any subsequent reaction of these mono-nitro compounds be carried out under such conditions that the decomposition of any poly-nitro compounds present can be avoided as far as possible. Furthermore, the reduction of these poly-nitro compounds gives rise to polyamines which have high melting points and are therefore objectionable when later added to aviation fuels.

This invention, therefore, has for its main object a method of nitrating aromatic hydrocarbons under such conditions that the amount of poly-nitro compounds produced is considerably reduced.

Another object of this invention is to further react the mono-nitro compound under such conditions that the hazards encountered due to the presence of poly-nitro compounds are overcome.

A further object of this invention is to provide a unitary process for the preparation of aromatic amines from aromatic hydrocarbons in an economical and otherwise commercially feasible manner.

According to the present invention, these and other objects of this invention are attained by nitrating aromatic hydrocarbons in the presence of a large excess of the aromatic hydrocarbon and subsequently reducing the mono-nitro compound produced in the presence of this large excess of the aromatic hydrocarbon. The presence of the aromatic hydrocarbon in large excess results in the reduction of the proportion of nitrating acid to a point below that necessary to convert all the hydrocarbons to the mono-nitro derivative with the result that very little of the poly-nitro derivatives will be formed. Furthermore, the presence of this excess hydrocarbon in a subsequent hydrogenation unit during the reduction of the nitro group to the corresponding amino group will aid in controlling the temperature to such an extent that the temperature can be maintained below that at which any poly-nitro compound present decomposes.

For illustration, one concrete embodiment of this invention is shown in the diagrammatic flow chart comprising a single view of the accompanying drawing. For convenience and as an illustration of its applicability, the process will be described in connection with the preparation of xylidene. However, this description is not to be taken as a limitation on the present invention as the invention is capable of embodiment in many different forms and is equally applicable to the formation of the nitro compounds and corresponding amines from any desired aromatic hydrocarbon.

Referring to the drawing, xylidene in tank 1 is led through line 2 into nitration unit 3. This nitration unit contains a mixture of sulfuric and nitric acids introduced through line 5 from tank 4. It is desirable that the acid mixture be suitable for the selective production of the mono-nitro compound. For this purpose sulfuric acid should be present in the proportion of 1½ parts by weight per part of nitric acid. In the usual method for preparing mono-nitro xylene, the xylene is introduced into the nitrating unit in the ratio of one part by weight of the hydrocarbon to 3 parts by weight of the acid mixture. However, according to the present invention, the xylene is introduced in large excess, for example, in the ratio of 200 parts by weight of hydrocarbon to 300 parts by weight of the acid mixture where the hydrocarbon is present in 100% excess.

The temperature in the nitration unit 3 is maintained preferably between 0° and 30° C. The apparatus for carrying out the nitration may be any suitable type of apparatus known to the prior art. For example, it may contain a stirrer and be provided with internal or external cooling means.

The mixture of mono-nitro xylenes and spent acid are removed from nitration unit 3 through line 6 and introduced into separator 7 where the oily mono-nitro xylenes and un-nitrated xylenes are separated from the spent acid. The spent acid is withdrawn from the separator through line 8 while the mono-nitro xylenes are removed through line 9 as a solution in the excess xylene. This solution of the mono-nitro xylenes in xylene is then introduced into the hydrogenation unit 10 where it is contacted with hydrogen introduced through line 11 in the presence of a suitable hydrogenation catalyst. Such catalyst may be molybdenum sulfide deposited on charcoal, tungsten sulfide and a mixture of one part of nickel and two parts of tungsten sulfide, molybdenum oxide or zinc oxide deposited on magnesium oxide and molybdenum sulfide. A particularly suitable catalyst is 15% molybdenum sulfide deposited on charcoal.

Temperatures in the hydrogenation unit are maintained between 200° and 250° C., preferably about 230° C. Pressures may run from 600 to 700 lbs./sq. in. It is desirable to employ between 6,000 and 10,000, preferably about 8,000 cu. ft. of hydrogen per barrel of nitro compound. If desired, additional amounts of xylene diluent may be introduced into the hydrogenation unit through line 12. As stated above, the presence of xylene during the reduction of the nitro compound allows the temperature to be controlled and thus avoids the hazards incident to the presence of even small amounts of poly-nitro derivatives.

Reaction products are withdrawn from hydrogenation unit 10 through line 13 and passed to separator 14 where water of reaction is removed through line 15. The xylidene remains in solution in the xylene diluent and is withdrawn from separator 14 through line 16 and passed to storage in tank 17.

From the above description it is obvious that an economically feasible unitary process has been described for the preparation of aromatic amines from aromatic hydrocarbons.

The nature and objects of the present invention having thus been set forth and a specific embodiment of the same given, what is claimed as new and useful and desired to be secured by Letters Patent is:

1. A process for the preparation of aromatic mono-nitro hydrocarbons which comprises nitrating aromatic hydrocarbons in the presence of an excess of the aromatic hydrocarbon.

2. A process for the preparation of aromatic mono-nitro hydrocarbons which comprises reacting aromatic hydrocarbons with a mixture of one part by weight of 75% nitric acid and 1½ parts by weight of 96% sulfuric acid at a temperature between 0° and 30° C. in the presence of an excess of the aromatic hydrocarbon.

3. A process for preparing mono-nitro xylene which comprises nitrating xylene with a mixture of 1 part by weight of 75% nitric acid and 1½ parts by weight of 96% sulfuric acid at a temperature between 0° and 30° C. in the presence of an excess of xylene.

4. A process for preparing mono-nitro xylene which comprises nitrating xylene with a mixture of 1 part by weight of 75% nitric acid and 1½ parts by weight of 96% sulfuric acid at a temperature between 0° and 30° C. in the presence of 100% excess of xylene.

5. A unitary process for the preparation of aromatic amines which comprises reacting aromatic hydrocarbons with nitric acid in the presence of an excess of the aromatic hydrocarbon, separating the spent acid and hydrogenating the nitro compound while in solution in the excess aromatic hydrocarbon.

6. A unitary process for the preparation of xylidene which comprises reacting xylene with a mixture of 1 part by weight of 75% nitric acid and 1½ parts by weight of 96% sulfuric acid at a temperature between 0° and 30° C. in the presence of 100% excess xylene, separating the spent acid and reducing the nitro xylene while in solution in the excess xylene with hydrogen in the presence of a hydrogenation catalyst at a temperature of 230° C. and under a pressure of 600 to 700 lbs./sq. in.

EDWARD H. McARDLE.

REFERENCES CITED

The following references are of record in the file of this patent:

UNITED STATES PATENTS

| Number | Name | Date |
|---|---|---|
| 1,124,776 | Marwedel | Jan. 12, 1915 |
| 1,530,392 | Morrell | Mar. 17, 1925 |
| 1,662,421 | Herold et al. | Mar. 13, 1928 |
| 1,844,362 | Ihrig | Feb. 9, 1932 |
| 1,878,950 | Lyford | Sept. 20, 1932 |
| 2,039,259 | Pier et al. | Apr. 28, 1936 |
| 2,233,128 | Henke | Feb. 25, 1941 |
| 2,233,129 | Henke | Feb. 25, 1941 |
| 2,252,927 | Heard | Aug. 19, 1941 |
| 2,252,928 | Marschner | Aug. 19, 1941 |